United States Patent [19]

Lynch

[11] Patent Number: 4,569,620
[45] Date of Patent: Feb. 11, 1986

[54] BOOK TURN-AROUND AND STACK ACCUMULATOR APPARATUS

[75] Inventor: Michael A. Lynch, Keene, N.H.

[73] Assignee: permaTek, Inc., Las Vegas, Nev.

[21] Appl. No.: 444,311

[22] Filed: Nov. 24, 1982

[51] Int. Cl.$^4$ .................... B42C 11/04; B65G 47/22
[52] U.S. Cl. .................................. 412/21; 198/405;
  414/31; 414/55; 414/96
[58] Field of Search ............... 414/31, 55, 96, 757;
  198/374, 399, 405; 412/19, 21

[56] References Cited

U.S. PATENT DOCUMENTS

| | | | |
|---|---|---|---|
| 3,593,624 | 7/1971 | Dufour | 414/31 X |
| 3,776,404 | 12/1973 | Anastasio et al. | 198/374 X |
| 4,226,324 | 10/1980 | Stocker | 198/405 |
| 4,331,415 | 5/1982 | Blatz et al. | 414/96 |

FOREIGN PATENT DOCUMENTS

| | | | |
|---|---|---|---|
| 2432579 | 1/1976 | Fed. Rep. of Germany | 414/31 |
| 2947033 | 5/1981 | Fed. Rep. of Germany | 198/374 |
| 302431 | 3/1972 | U.S.S.R. | 198/399 |

Primary Examiner—Robert J. Spar
Assistant Examiner—Janice Krizek
Attorney, Agent, or Firm—Yuter, Rosen & Dainow

[57] ABSTRACT

In apparatus for manufacturing and packaging bound books a turnover device is provided for turning over alternate books fed by a conveyor from a building-in machine and leading to a stacking device where such books are accumulated in stacks and delivered for packaging. The turnover device lifts alternate books from the consecutive line of books on an in-feed conveyor, turns the lifted books 180°, and replaces them in the spaces left vacant when the books were lifted. The conveyor system then transports these books positioned in alternate orientation, such that when they are stacked, their spines or backbones are on alternate sides of the stack which renders each stack less high, more stable and compact and easier to handle in subsequent packaging and shipping operations. The turnover device comprises a pair of continuous belts about rotating drums where each belt is twisted through 180° and the belts are situated such that a moving pocket is created between adjacent belts whose portions pass through the 180° twist; the pocket transports the books through a twisted passage, while simultaneously holding and supporting the books until delivery in the turned-over state.

9 Claims, 11 Drawing Figures

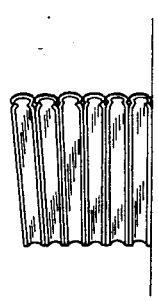
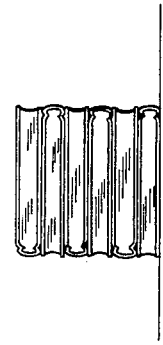
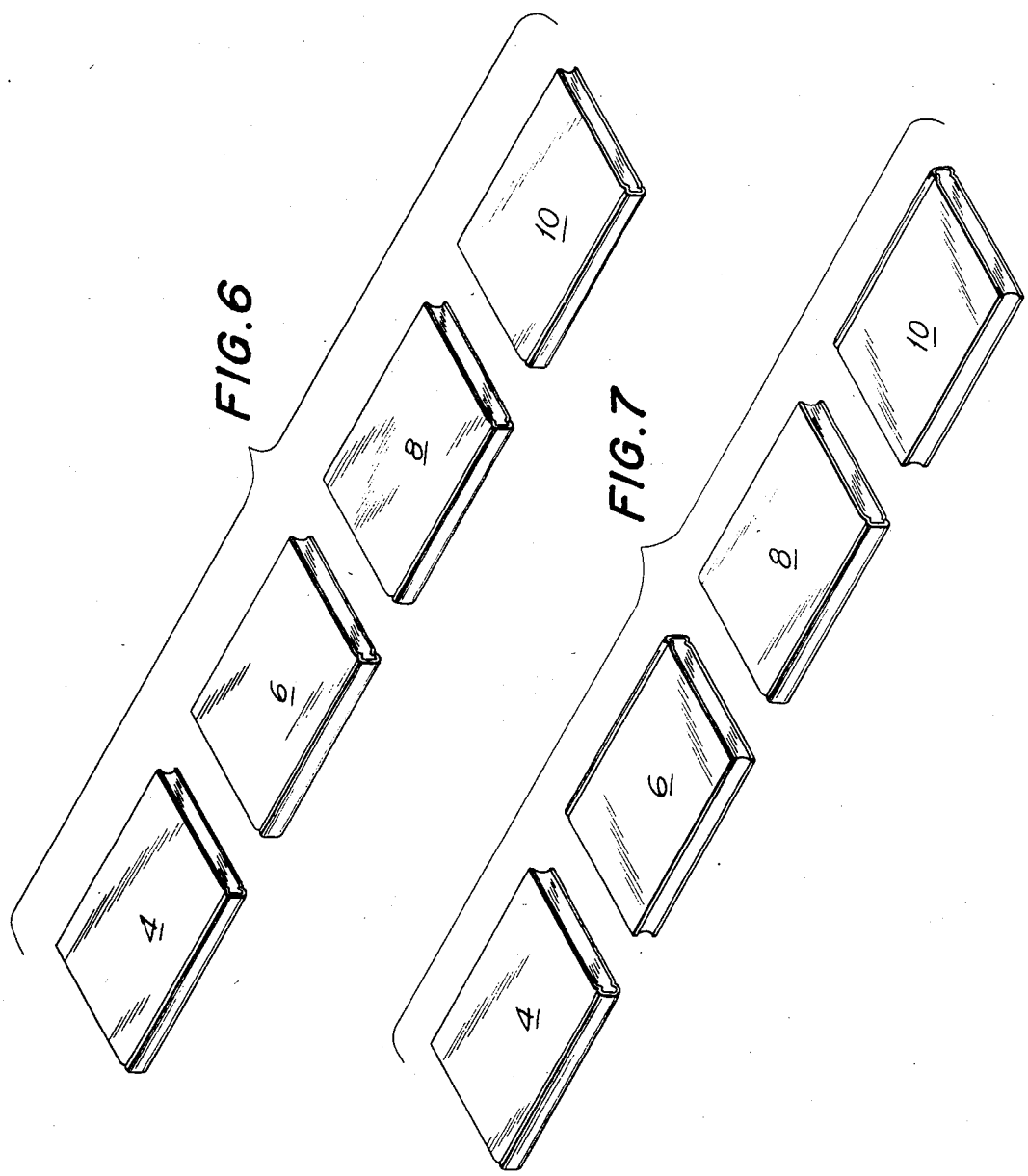

BOOK TURN-AROUND AND STACK ACCUMULATOR APPARATUS

BACKGROUND OF THE INVENTION

In the modern manufacture of both softbound and hardbound books, obviously important objectives are the rate of books produced and consistent and reliable high quality of the products. In recent years there has been good progress in the development of various procedures and machinery for the manufacture of books at much higher rates than previously considered possible, i.e. one hundred books per minute as the output delivery rate. Typically the books discharged from a building-in machine, as described in applicant's copending application, Ser. No. 379,037, filed May 17, 1982, are all in the same orientation, which means that the spine or backbone of each book is aligned with the spine of the next. The obvious next step is for such books to be stacked for packaging in cartons and final shipment.

It has been found that stacking of books whose spines are similarly aligned leads to an undesirable situation, since the spine edge of each book is usally thicker than the opposite free edges of the cover and the pages. Not only are stacks of such books somewhat unstable as they tend to lean and tip, but any particular stack would have greater height than a stack comprising the same number of books which are oriented alternately so that odd numbered books have the original orientation and even numbered books are rotated 180°. With the spines so alternated on opposite edges of the stack, the stacks will have reduced height and thus occupy less space on the equipment, in the factory and in the cartons or other packaging used.

Once it was determined that the books must be stacked in alternate orientation as described above, the prior art discloses manual techniques eventually replaced by mechanical devices. Where workers manually lift, rotate and put down each appropriate book to create the proper stacking orientation the result is unacceptable in a high speed mass production assembly line. The obvious development for this problem of a mechanical device, typically based upon a Geneva mechanism which lifts and rotates appropriate alternate books and puts them down, eliminates the manual aspect; however, such apparatus still has a number of severe limitations, primarily in that the device must grasp a moving book, rotate and then reposition such book on a fast moving conveyor. Geneva-type mechanisms of the prior art have the inherent limitation that the device is continually stopping and starting, which means average velocity will be greatly reduced, with the additional restriction on velocity due to acceleration and deceleration limitation. Furthermore, it is expensive and complicated to cause a book, moving at a velocity of 100 books per minute or 85–100 feet per minute, to stop, rotate 180°, and to reattain the prior velocity while being precisely relocated and oriented on a moving belt. Accordingly, known mechanisms in the prior art for rotating books cause the overall process to have significantly reduced speed from that of the infeed conveyor delivering books from a building-in machine. Consequently the final stacking and packaging stages are reduced in speed to that of the book rotation mechanism and the great benefits of high speed manufacture are defeated by an interim phase of manufacture.

The present invention provides a solution to this problem in the form of a book turnover device which provides for the 180° rotation without any loss in speed of the books delivered by the infeed conveyor at its maximum speed. An optional combination with the turnover device is a stack accumulator which forms said books into stacks, each stack formed from the bottom upwardly. A summary of the invention followed by a detailed description of the preferred embodiment follows below.

SUMMARY OF THE INVENTION

The invention is a belt turnover and stacker apparatus for use with an infeed conveyor carrying books or other articles all oriented similarly with their spines in alignment. The apparatus removes every other book from the moving conveyor, rotates each removed book through 180° and returns the rotated book to the moving conveyor without a change in speed in the transport of the books. The belt turnover apparatus comprises three generally parallel conveyor belt sub-assemblies or units cooperating as follows.

The first conveyor unit comprises a pair of upstream and downstream rollers circumscribed by a first continuous conveyor belt with the belt twisted through 180° along its length between the rollers; the second unit comprises a second pair of rollers circumscribed by a second continuous conveyor belt similarly twisted as the first; and the third conveyor unit comprises a third pair of rollers circumscribed by a third continuous belt untwisted. The upstream rollers of the first and second belts are closely adjacent and similarly the downstream rollers for these belts are adjacent, thereby establishing a parallel space or pocket between the adjacent first and second belts, which pocket continues along the twisted length of the belts between the rollers. The space of pocket between the belts is dimensioned to receive, engage, hold and transport an article such as a book from the "bite" between the two upstream rollers to the discharge area between the two downstream rollers. The third belt unit has its upstream and downstream rollers near and below corresponding rollers of the first two units. In combination with and upstream of the belt turnover apparatus is a floating conveyor for feeding the turnover apparatus, and an optional stack accumulator device for receiving and stacking books delivered from this turnover apparatus. The floating conveyor is pivotable for delivering alternately one book to the "bite" between upstream rollers of the turnover apparatus, and a lower position for delivering the alternate books to the third conveyor immediately below the turnover device. Consequently a plurality of regular and consecutively spaced books on an infeed conveyor are separated, with alternate books going to the belt turnover apparatus, thereby leaving spaces between alternate undisturbed books going to the lower conveyor. At the downstream end of the belt turnover apparatus the turned-over books are redeposited into the spaces left between the undisturbed books, then the alternately oriented books are discharged at the same rate that they were entering the system on the infeed conveyor.

The stack accumulator receives books from the belt turnover device and moves them one at a time upwardly, thus forming the stack from the bottom. When a predetermined number of books is accumulated in a stack, a pusher pushes the stack transversely onto a delivery table while the accumulator mechanism continues to deliver books upwardly forming a new stack.

A preferred embodiment of the invention is illustrated in the drawings appended hereto and described in sections immediately following.

BRIEF DESCRIPTION OF THE DRAWINGS

FIGS. 6 and 6a illustrate a conventional stack of accumulated books; and

FIGS. 7 and 7a illustrate a stack of alternately oriented books according to the present invention.

DETAILED DESCRIPTION OF THE PREFERRED EMBODIMENT

Figure 1:
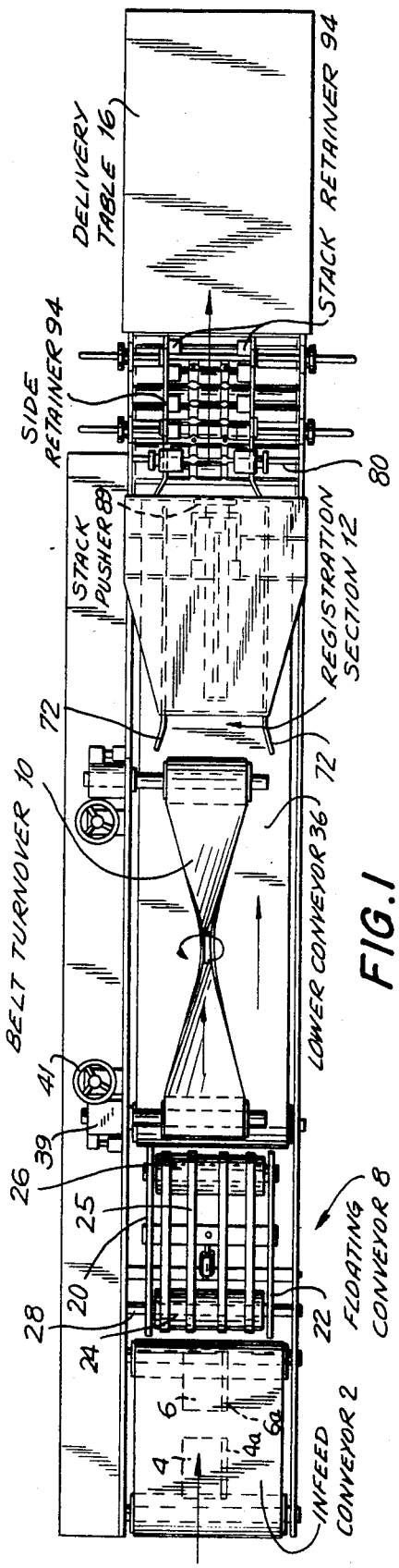
FIG. 1 is a plan view of the belt turnover apparatus and stack accumulator.

FIG. 1 shows a portion of the manufacturing process for books beginning with an infeed conveyor 2 which delivers books at a high rate of speed from a building-in machine where the covers are attached to the book blocks resulting in essentially finished books. On this conveyor 2 the books indicated by reference numbers 4 and 6 are shown to have the same orientation, namely that the spines 4a and 6a of the books respectively are positioned similarly and are aligned.

FIGS. 6 and 6a indicate schematically how books oriented with their spines aligned will produce a stack which is higher and less stable than books of FIG. 7 which have alternate orientation producing the stack of FIG. 7a.

Downstream of the infeed conveyor 2 is a floating conveyor 8 followed by the belt turnover apparatus 10, followed by a registration section 12, followed by a stack accumulator 14 and finally a delivery table 16. These components of the overall system will now be described in greater detail as shown particularly in FIGS. 1 and 2.

The infeed conveyor 2 is a basic flexible conveyor belt apparatus on rolling drums 18 and moving at a very rapid rate for delivering books at speeds as high as 100 units per minute. The floating conveyor 8 is generally similar with a framework including left and rights bars 20 and 22 which support rear drum 24 and front drum 26. This framework as a whole is pivotable about axis 28 which is the central axis of drum 24 between its upward and downward position. As shown in dotted lines in FIG. 2, the framework has been pivoted downward to the lower position, whereby the top surface 32 of conveyor 8 is generally aligned with the top surface 34 of lower conveyor 36 of the book turnover apparatus 10. Accordingly a book 38 on the surface 32 of floating conveyor 8 in its lower position would be directed to land onto surface 34 of the next adjacent lower conveyor 36.

Figure 2:
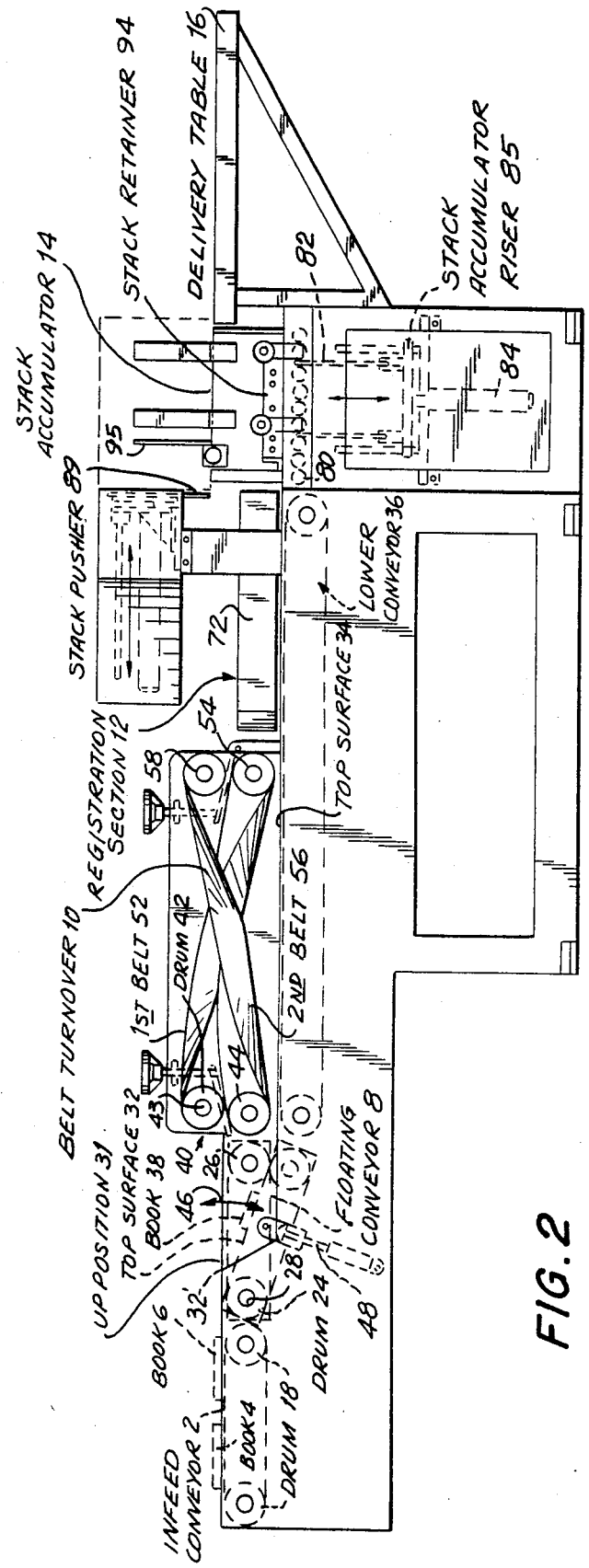
FIG. 2 is a front elevation view of FIG. 1.

When floating conveyor 8 is in its upper position illustrated in solid line 31, so that its downstream drum 26 is shown to be aligned with drums 18 and 24 in FIG. 2, then upper surface 32 of conveyor 8 will be aligned with the "bite" indicated by arrow 40 between drums 42 and 44 of the turnover apparatus 10. Accordingly, the floating conveyor 8 is moved alternately between its upper position and lower positions, as indicated by arrow 46, this movement being caused and controlled by the pneumatic device 48 also shown in FIG. 2 which engages and drives the framework 20 of the floating conveyor 8 between its positions. The speed of operation of the drive device 48 is established so as to deliver the books from infeed conveyor 2 alternately to lower conveyor 34 and into the bite 40 of the turnover apparatus. A photocell optical device 50, seen in FIG. 3, senses the presence of books on conveyor 8 and automatically controls the solenoid drive mechanism 48 to direct the books to the correct conveyor next adjacent downstream. Also shown in FIG. 3, the upstream and downstream drums 24 and 26 respectively each comprise a series of rollers 24a instead of one continuous drum, which is an optional structure with the series of belts 25.

Figure 3:
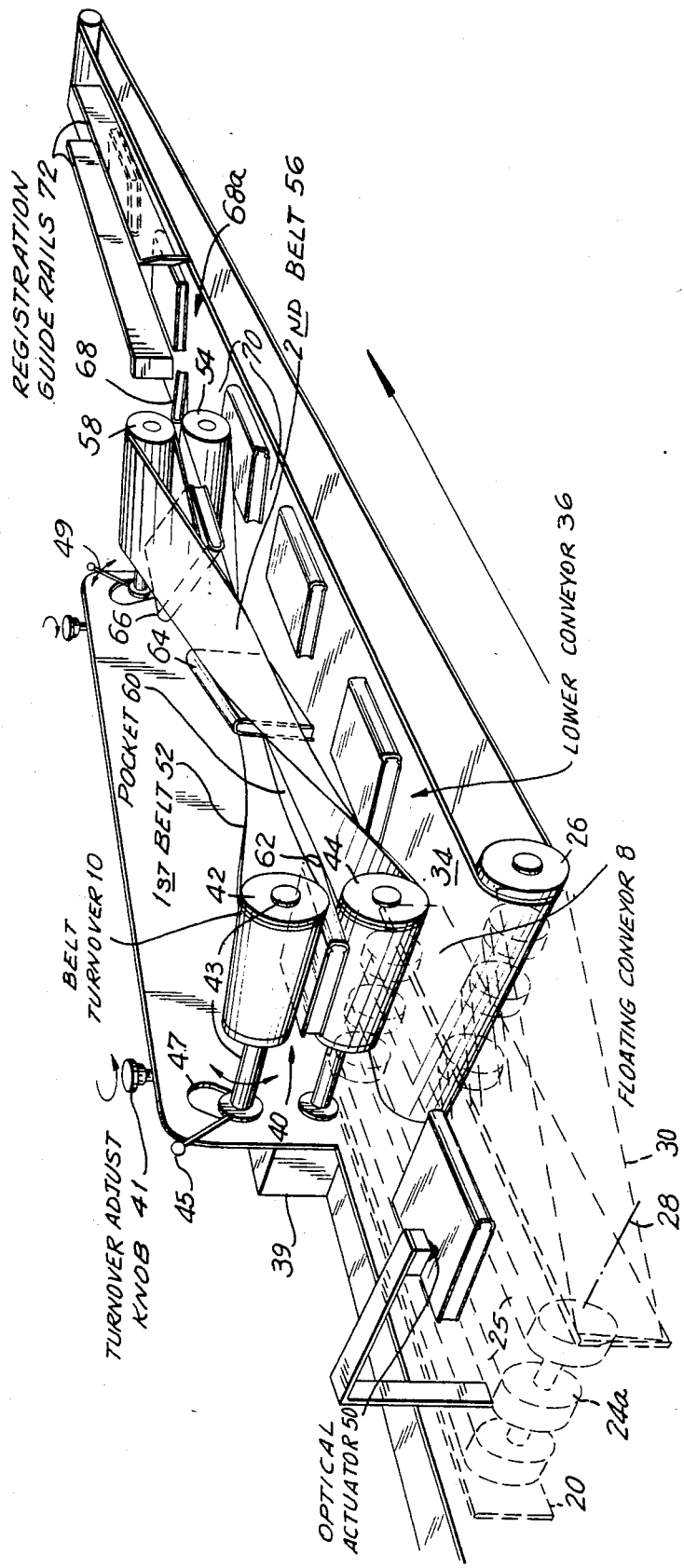
FIG. 3 is a front perspective view of the belt turnover apparatus of FIG. 1.

As shown in FIGS. 1, 2 and 3 the turnover device consists of a first belt 52 having its upstream end about drum 42 and its downstream end about drum 54 which is lower in elevation than drum 42. A second belt 56 has its upstream end about drum 44 and its downstream end about drum 58 which is elevated above drum 54 and generally aligned with drum 42. Shown most clearly in FIG. 3, the second belt 56 is twisted though 180° as it extends between its opposite drums 44 and 58. Similarly the first belt 52 has a twist which causes corresponding parts of belt 52 adjacent to 56 to be parallel along most of the length, creating a pocket 60 for receiving books one at a time through bite 40. This pocket engages and securely holds each book while it simultaneously rotates the book from the initial position shown by book 62 in FIG. 3, to a half turn or 90° twisted position shown by book 64, to an almost fully turned position of book 66, and to a finally and fully 180° turned position of book 68 which is leaving the turnover mechanism.

The axle 43 of drum 42 is moveable by a lever 45 in slot 47 to vary the thickness of bite 40 for accommodation of books of different thicknesses. A similar lever 49 moves the axle of drum 58 in a corresponding slot in a manner similar to the lever 45 for the downstream end of the belt so that the pocket between the two belts will be of uniform thickness throughout their length.

It should be noted in FIG. 3 that the lower conveyor 36 has spaces 70 between alternate books; these spaces were created by the floating conveyor 8 which directed alternate books to the turnover device, thus leaving these spaces. At the downstream end of the turnover device, the turned-over book 68, for example, is redeposited into the space 68a previously created by the floating conveyor. From this it should be apparent that the speeds of conveyors 2, 8 and 34 can all be the same and can remain unreduced from the original speed, even though alternate books have been conducted through a 180° turning operation. Associated with lever 45 to adjust the position of drum 42 is an adjustment knob 41, and a similar adjustment knob is used at the downstream end.

In the system thus described, the next operation is a registration section 12 having left and right guide rails 72 for assuring that each book is accurately positioned and oriented as it approaches the stack accumulator 14.

Figure 4:
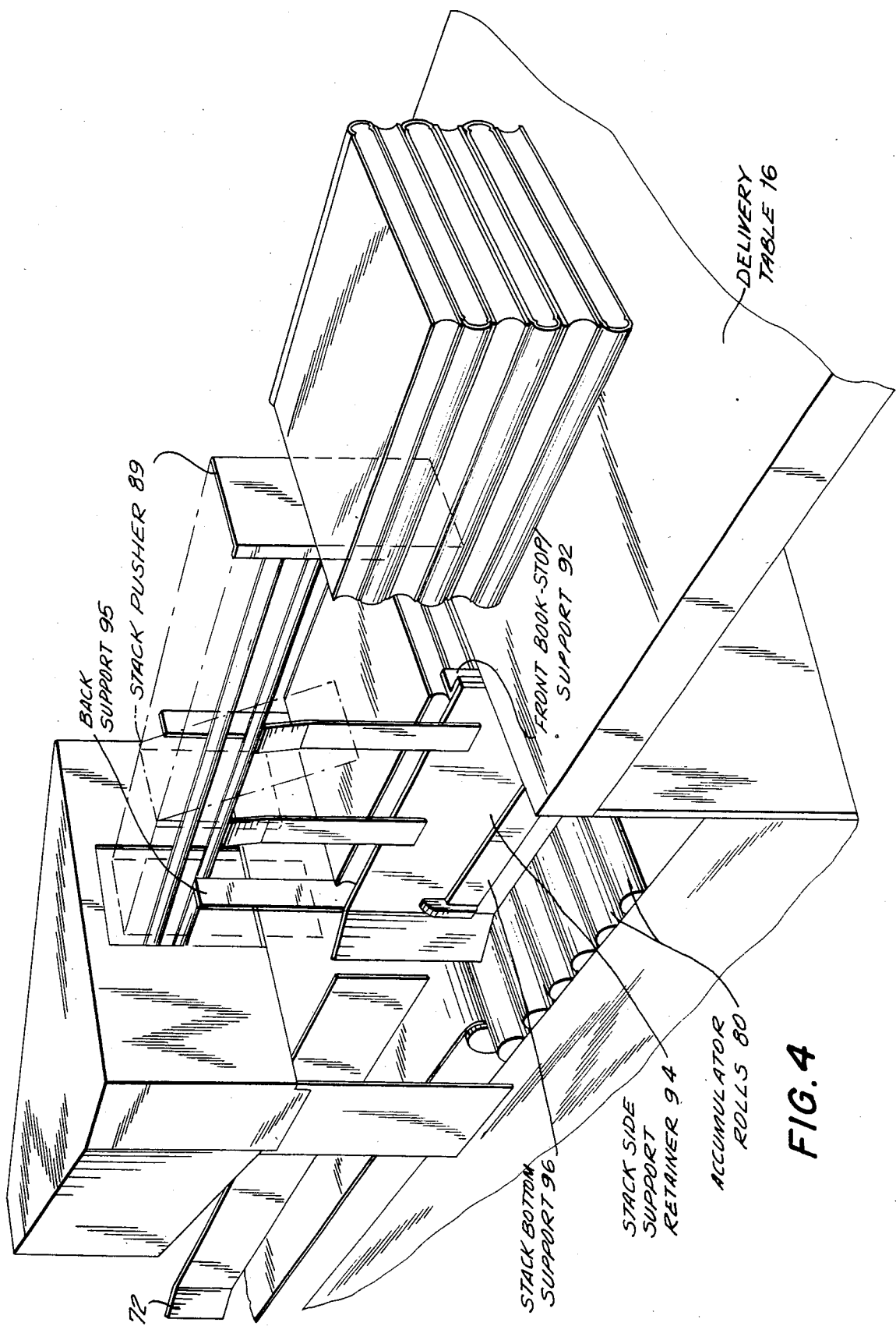
FIG. 4 is a front perspective view of the stack accumulator of FIG. 1.
Figure 5A:
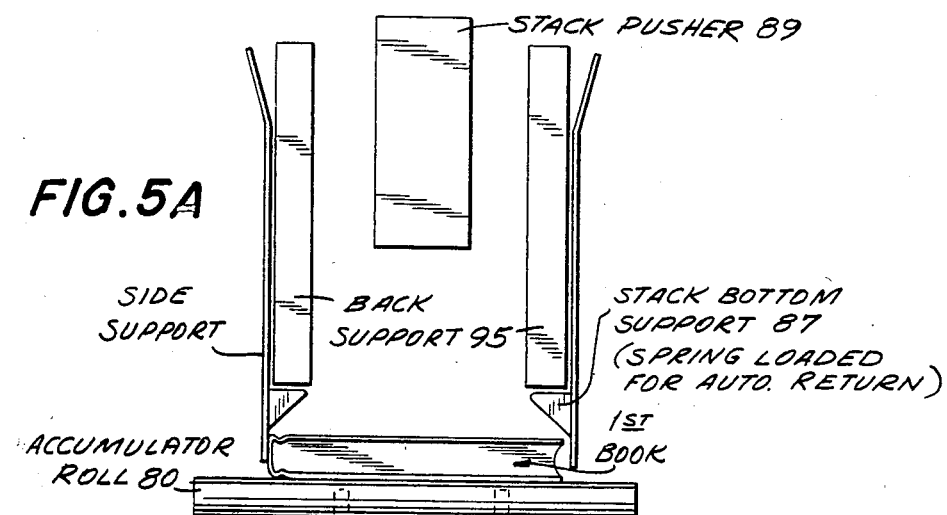
FIGS. 5a, 5b, and 5c are side elevation views of the stack accumulator during successive phases of operation.
Figure 5C:
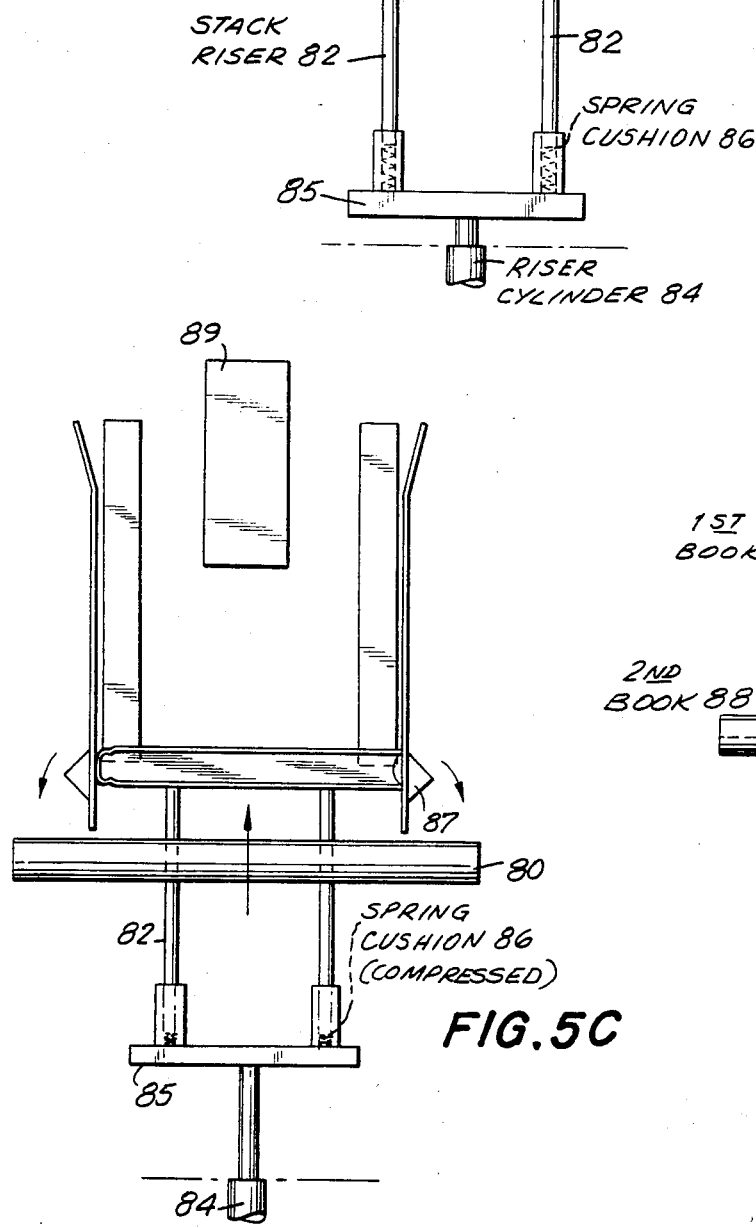
Figure 5B:
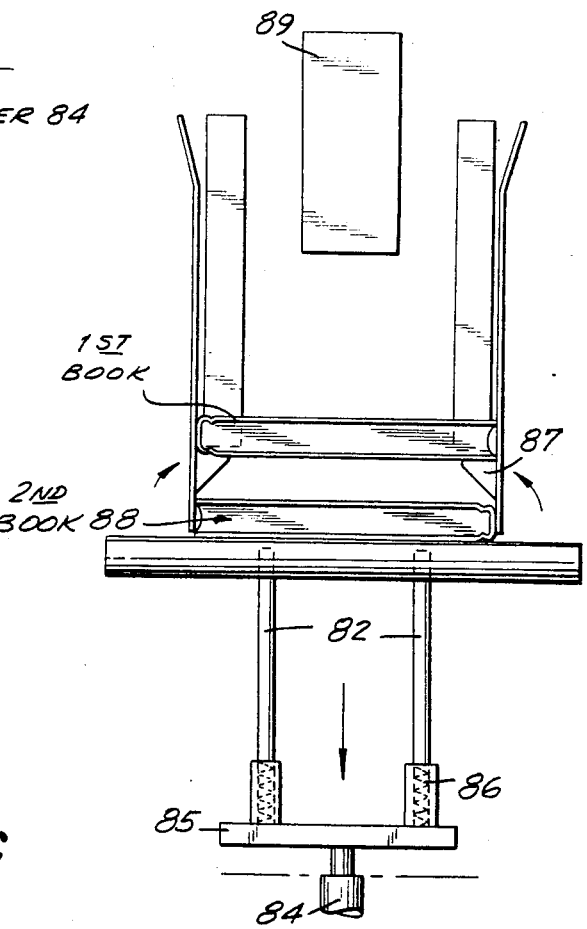

The stack accumulator is a device for accumulating books fed from the conveyor in the registration section, and forming these books into a vertical stack of alternately oriented volumes. The accumulator is illustrated at the right in FIGS. 1 and 2, in a perspective view of FIG. 4, and in FIGS. 5a through 5c showing particular details, as described below. Each book arrives onto the accumulator rolls 80; between the rolls are vertical stack risers 82 which are driven upward by pneumatic riser cylinder 84 and table 85 which presses upward via spring cushion 86 on the bottom of all the stack risers. The top ends of the risers engage and drive each book upwardly, causing the spring loaded stack bottom supports 87 seen in FIG. 5a to pivot out of the way as indicated in FIG. 5c as the book passes upward; FIG. 5b shows the first book immediately above the stack supports 87 which have now pivoted back to their basic position wherein they support the book and any books above. Meanwhile, in FIG. 5b, a second book 88 has arrived on the rollers 80 and is about to be driven upward by riser 82 as indicated in FIG. 5c.

A counter (not shown) counts the number of books in the stack, and when the predetermined number has been achieved the stack pusher 89 drives the accumulated stack downstream onto the delivery table 16.

The stack accumulator 14 comprises a framework for guiding and maintaining books in proper alignment as a stack is formed. In particular there are front book stops 92 which stop forward or downstream motion of books and establish the front plane of the stack; there are side retainers 94; stack supports 95, and bottom supports 96.

A counter and sensors (not shown) are or may be incorporated into the stack accumulator to allow this device to accomodate different sizes, styles and number of books before the pusher 89 drives the stack onto the delivery table. The stack accumulator at the downstream end of the various conveyors which run at a continuous speed, accumulates the books into stacks at essentially the same speed that they are delivered off the conveyors, so that the entire process can continue without reduction in rate of delivery of finished books for packaging. With this system, books are transported at the rate of as many as 100 per minute which is a significant improvement over prior art systems wherein turn-around and/or stacker devices were slower than the infeed conveyor and thus reduced the overall rate of production to less than 50 articles per minute. Prior turn-around apparatus, such as mechanical Geneva drive mechanisms inherently involve stop and go motion which by definition could not be equal or equivalent in overall speed to continuous high speed motion of the present system. In practice Geneva drives deliver about 45 books per minute at best, and manual turn-around would be about twice as slow.

The belt turnover sub-assembly shown and providing the moving pocket, uses vinyl-impregnated belts which are approximately four inches wide by one-sixteenth inch thick, similar to standard belts manufactured by Habasit Belting, Inc. The various, conveyors are preferably driven from a single rotary drive means 39 and timing belt or chain drive, not shown, which assures that the transport speed in the component sections will be constant and uniform. The stack riser and pusher elements are preferably driven by solenoids as generally indicated.

This new invention can be used with hardbound and softbound books and with any other generally similar articles which need to be rotated 180° without losing transport speed of the overall process, particularly the continuous in-line book manufacturing process described above.

There are numerous other embodiments of this invention possible within the spirit and scope of the basic invention herein and the claims which follow.

What is claimed is:

1. A book turn-around and stack accumulator apparatus comprising: frame means, first and second conveyor belt units generally parallel and adjacent to each other, each unit comprising a pair of upstream and downstream rollers mounted to said frame means and a continuous belt extending between said circumscribing said pair of rollers, the first and second belts of the first and second units respectively being twisted through 180° along their length and being situated closely adjacent, and the upstream rollers of the first and second units being closely adjacent forming a "bite" for receiving a book therebetween, the downstream rollers of said first and second units similarly being closely adjacent thereby defining a moving pocket between said belts along their length between upstream and downstream rollers for receiving, securely holding, transporting books along the length of the two conveyor units while simultaneously twisting each book side for side through a 180° turn, and discharging each book in its turned orientation, and first drive means for driving the belts of said first and second units at the same and continuous velocity, and further comprising a third conveyor belt unit generally parallel and adjacent to said first and second units, said third unit comprising a pair of upstream and downstream rollers mounted to said frame means and a continuous and untwisted belt extending between and circumscribing said rollers, the third belt having a top surface situated below the belts of said first and second units for receiving turned over books discharged from said moving pocket, and means for alternately feeding said books into said "bite" and onto said third conveyor belt unit, said first drive means driving said third unit at the same horizontal velocity as said first and second units between said upstream and downstream rollers, each book discharged from said pocket being spaced on said third conveyor belt unit between said books fed directly to said third conveyor belt unit, and further comprising means for accumulating a plurality of said books from said third conveyor belt unit and forming said books into stacks.

2. Apparatus according to claim 1 wherein the upstream roller of said first unit is above the upstream roller of the second unit and the downstream roller of the first unit is below the downstream roller of the second unit.

3. Apparatus according to claim 1 further comprising adjustment means for varying the radial distance between the axis of said upstream roller of said first and second units to thereby vary the bite and thickness of said pocket for accomodating books of different sizes.

4. Apparatus according to claim 1 wherein said means for alternately feeding said books includes a floating conveyor positioned upstream of said first, second and third conveyor belt units, said floating conveyor comprising a pair of upstream and downstream rollers mounted to a sub-frame and a continuous belt extending between and circumscribing said rollers, the sub-frame being pivotable about the axis of its upstream roller between a first position where the top surface of said floating conveyor is aligned generally with said "bite" and a second position where said top surface of said floating conveyor belt is aligned with the top surface of said third conveyor unit, and second drive means for pivoting said sub-frame conveyor between said first and second positions for discharging books alternately into said bite and onto said third conveyor unit.

5. Apparatus according to claim 4 further comprising sensing means for sensing the presence of a book on said floating conveyor and directing said second drive means to drive said floating conveyor between said first and second positions for each book thereon.

6. Apparatus according to claim 5 wherein the stack accumulator includes first means for receiving one book at a time from said third unit, riser means for engaging and elevating each received book upward, guide means for guiding said books moved upward into a stack formation, support means for supporting each book moved upward and maintaining said elevated book and stack above said first means, and pusher means for pushing said stack transversely thereof when a predetermined number of books are in said stack.

7. Apparatus according to claim 6 wherein said first means comprises a plurality of axially aligned rollers and said riser means comprises elongated elements moveable upwardly between adjacent rollers of said first means.

8. Apparatus according to claim 7 and further comprising means for driving said stack accumulator, wherein said drive means of said floating conveyor and of said stack accumulator each comprises solenoid drive means.

9. Apparatus according to claim 4 and further comprising in combination therewith a building-in machine for adhereing covers to book blocks.

* * * * *